(12) United States Patent
Namazue et al.

(10) Patent No.: US 7,016,129 B2
(45) Date of Patent: Mar. 21, 2006

(54) OPTICAL FILTER, METHOD OF MAKING OPTICAL FILTER, LIGHT AMOUNT ADJUSTING APPARATUS AND OPTICAL EQUIPMENT

(75) Inventors: Eriko Namazue, Tokyo (JP); Ichiro Onuki, Kanagawa (JP); Takeshi Miyazaki, Kanagawa (JP); Masataka Yashima, Tokyo (JP); Akio Kashiwazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/839,082

(22) Filed: May 5, 2004

(65) Prior Publication Data
US 2004/0240068 A1    Dec. 2, 2004

(30) Foreign Application Priority Data
May 28, 2003    (JP)    ............................. 2003-150844

(51) Int. Cl.
*G02B 5/22*    (2006.01)
(52) U.S. Cl. ............... 359/888; 359/885; 359/889; 348/362
(58) Field of Classification Search ............... 359/885, 359/888–889, 891–892; 348/362
See application file for complete search history.

(56) References Cited

U.S. PATENT DOCUMENTS

| | | | | |
|---|---|---|---|---|
| 3,627,926 A | * | 12/1971 | Nichols | 348/835 |
| 3,856,418 A | * | 12/1974 | Levine | 356/233 |
| 2004/0021967 A1 | * | 2/2004 | Yanagi et al. | 359/885 |
| 2005/0207045 A1 | * | 9/2005 | Hewlett | 359/888 |

FOREIGN PATENT DOCUMENTS

| | | | |
|---|---|---|---|
| JP | 04-151102 | * | 5/1992 |
| JP | H5(1993)-173004 | | 7/1993 |
| JP | H6(1994)-095208 | | 4/1994 |
| JP | H6(1994)-273601 | | 9/1994 |
| JP | H11(1999)-014923 | | 1/1999 |
| JP | H11(1999)-015042 | | 1/1999 |

* cited by examiner

*Primary Examiner*—Leonidas Boutsikaris
(74) *Attorney, Agent, or Firm*—Cowan, Liebowitz & Latman, P.C.

(57) ABSTRACT

An optical filter which can be manufactured at low cost and is excellent in optical characteristics is disclosed. The optical filter has a transparent substrate and a first layer which is formed on the surface of the transparent substrate. Here, the first layer has a first area which is substantially transparent and a second area which has colored ink and is light-amount adjustable, and the optical path lengths with respect to the first and the second areas are substantially equal.

7 Claims, 7 Drawing Sheets

OPTICAL FILTER, METHOD OF MAKING OPTICAL FILTER, LIGHT AMOUNT ADJUSTING APPARATUS AND OPTICAL EQUIPMENT

BACKGROUND OF THE INVENTION

1. Field of the Invention

The present invention relates to an optical filter in a light amount adjusting apparatus used for optical equipment such as a camera or the like, and relates to a method of making the optical filter suitable for a process of making an ND filter whose spectral transmittance characteristic is substantially fixed in a visible light area, and a light amount adjusting apparatus and optical equipment which have the optical filter.

2. Description Of Related Art

A diaphragm apparatus has been hitherto provided in optical equipment such as a digital camera, a video camera or the like to adjust the amount of light incident on an image surface. It is normally general in the diaphragm apparatus to adjust the light amount by using a diaphragm blade.

However, particularly when the diaphragm diameter is excessively small for a high-luminance object, resolution is deteriorated due to refraction. Here, the diaphragm diameter is restricted and the amount of transmitted light is restricted by using a Neutral Density filter (hereinafter abbreviated as ND filter) or the like as a light amount adjusting member, thereby repressing a reduction in image quality.

Specifically, the ND filter as a separate member from a diaphragm blade is attached to a part of the diaphragm blade with adhesive agent. When a luminance of the object is high, the diaphragm is not narrowed down to the position in which the diaphragm diameter is excessively small, and the diaphragm aperture is set to a fixed size. Furthermore, the ND filter is located on the optical axis to thereby restrict the amount of transmitted light (to adjust the light amount).

On the other hand, as disclosed in Japanese Patent Application Laid-Open No. H6(1994)-95208 (Document 1), No. H11(1999)-15042 (Document 2), a filter which has a plurality of a light amount adjusting function, that is, has a density gradient is used as the ND filter, and light amount adjustment operation is carried out by advancing/retracting the filter into/from the image-taking optical path.

Furthermore, there have been proposed various diaphragm apparatus designed so that no ND filter is attached to the diaphragm blade and the ND filter moves independently.

Normally, metal film or dielectric film formed by deposition process or the like, or a member achieved by laminating a plurality of films described above is used for the ND filter as the light amount adjusting member in the diaphragm apparatus as described above. This is because above described materials are excellent in optical characteristics and durability.

Additionally, as another ND filter, there are a filter formed by mixing and kneading a light-absorbing dye or pigment into glass or transparent film forming material such as cellulose acetate, PET (polyethylene terephthalate) or the like, or a film formed by coating light-absorbing dye or pigment on a transparent substrate formed of the above material.

Furthermore, as disclosed in Japanese Patent Application Laid-Open No. H5(1995)-173004 (Document 3), a method for manufacturing an ND filter using silver haloid film is proposed.

On the other hand, as disclosed in Japanese Patent Application Laid-Open No. H11(1999)-14923 (Document 4), an optical filter having a density gradient is used as a light amount adjusting member in a laser beam printer or the like even when the spectral transmittance characteristic is not fixed.

However, the ND filter which is achieved by forming the film through the deposition process has a problem that the manufacturing cost is increased since the scale of the manufacturing apparatus is large and the manufacturing process is complicated, etc.

With respect to the method in which dye or pigment is mixed with a forming material of film or the like and the method in which dye or pigment is coated on a substrate, an ND filter having uniform density can be produced, but it is very difficult to produce an ND filter having a density gradient.

Here, when silver haloid film is used as in the case of the ND filter manufacturing method disclosed in Document 3, it is possible to make an ND filter having a density gradient, however, there is a problem that light scattering occurs due to silver particles remaining in the silver haloid film and thus the optical characteristics of the ND filter is deteriorated.

SUMMARY OF THE INVENTION

An object of the present invention is to provide an optical filter serving as a light amount adjusting member which is low in cost and excellent in optical characteristics, and a method of easily making the optical filter. Furthermore, another object of the present invention is to provide a light amount adjusting apparatus and an optical equipment which have the optical filter.

One aspect of an optical filter according to the present invention comprises a transparent substrate and a first layer which is formed on the surface of the transparent substrate. Here, the first layer has a first area which is substantially transparent and a second area which has colored ink and is light-amount adjustable, and the optical path lengths with respect to the first and the second areas are substantially equal.

One aspect of a method of making an optical filter according to the present invention is a method of making an optical filter having a first area which is substantially transparent and a second area which is colored and light-amount adjustable. Here, the method comprises a first step of forming a first layer on a surface of a transparent substrate and a second step of applying substantially transparent ink to the first area of the first layer and applying colored ink to the second area of the first layer.

One aspect of a light amount adjusting apparatus according to the present invention comprises the above optical filter and a light blocking member which varies an area of a light passing opening. Here, the optical filter is movable with respect to the light passing opening formed by the light blocking member.

One aspect of optical equipment according to the present invention comprises a lens and the above light amount adjusting apparatus.

The features of the optical filter, the method of making the optical filter, the light amount adjusting apparatus and the optical equipment according to the present invention will be clarified by the descriptions of the following specific embodiments with reference to the drawings.

DETAILED DESCRIPTION OF THE PREFERRED EMBODIMENTS

The present invention will be hereunder described in detail by referring to the preferred embodiments.

When an optical filter serving as a light amount adjusting member is manufactured by the manufacturing method according to the present invention, an ink reception layer (first layer) for absorbing ink is formed on a transparent substrate at first. The process of forming the ink reception layer will be described later. When the transparent substrate is used for the optical filter, the material of the transparent substrate is not limited to a specific one insofar as it has required characteristics such as mechanical strength, optical characteristics, etc.

For example, as a material of the transparent substrate, polyethylene terephthalate, diacetate, triacetate, cellophane, celluloid, polycarbonate, polyimide, polyvinyl chloride, polyvinylidene chloride, polyacrylate, polyethylene, polypropylene or the like may be used. A glass substrate may be used if it has the required characteristics.

According to the optical filter manufacturing method of the present invention, the ink reception layer is formed on the surface of the transparent substrate as described later. Here, any material may be used as the material for forming the ink reception layer insofar as it absorbs ink, receives the color material of the ink in the ink reception layer and fixes the color material. Specifically, the following water-soluble resins and water-dispersive resins may be used.

As a water-soluble resin, polyvinyl alcohol; denatured material of polyvinyl alcohol such as anion denatured polyvinyl alcohol, cation denatured polyvinyl alcohol, acetal denatured polyvinyl alcohol or the like; water-type polyurethane; polyvinyl pyrrolidone; denatured material of polyvinyl pyrrolidone such as a copolymer of vinyl pyrrolidone and vinyl acetate, a copolymer of vinyl pyrrolidone and dimethylaminoethyl methacylate, a copolymer of quaternized vinyl pyrrolidone and dimethylaminoethyl methacylate, a copolymer of vinyl pyrrolidone and methacryl amide propyl trimethyl ammonium chloride or the like; cellulosic water-soluble resin such as carboxymethyl cellulose, hydroxy ethyl cellulose, hydroxy propyl cellulose or the like; denatured material of cellulose such as cationized hydroxy ethyl cellulose or the like; polyester, polyacrylic acid (ester), melamine resin or denatured materials of these materials; synthesized resin such as a graft copolymer containing at least polyester and polyurethane; and natural resin such as albumin, gelatin, casein, starch, cationized starch, gum acacia, sodium alginate or the like may be mentioned.

As the water-dispersive resin, polyacetate vinyl, copolymer of ethylene and vinyl acetate, polystyrene, copolymer of styrene and (meta)acrylic ester, (meta)acrylic ester polymer, copolymer of vinyl acetate and (meta)acrylic acid (ester), poly(meta)acrylamide, (meta)acrylamide copolymer, styrene-isoprene copolymer, styrene-butadiene copolymer, styrene-propylene copolymer, polyvinyl ether, silicon-acrylic copolymer or the like may be mentioned.

Furthermore, it is possible to use a gap absorption type ink reception layer which is formed by coating a coating liquid which is the above-described resin containing alumina hydrate, amorphous silica or the like on the surface of a transparent substrate and generating fine pores (gaps between fine particles of alumina hydrate or amorphous silica) in the coating film so that ink is absorbed in the fine pores.

In order to enhance the coating performance of the ink reception layer, control of the ink absorption performance, the mechanical characteristics of the optical filter, etc., various additives such as a surface-active agent, crosslinking agent, dye fixing agent (water-proofing agent), antifoamer, antioxidant, viscosity controlling agent, pH controlling agent, fungicide, elasticizer, etc., may be contained in the material for forming the ink reception layer.

The ink reception layer is formed according to the following method. First, the material of water-soluble resin, the water-dispersive resin or the like which can receive ink as described above is dissolved or dispersed in a liquid medium which is selected from water, alcohol, polyalcohols or other appropriate organic solvents to prepare a coating liquid.

Subsequently, the coating liquid thus prepared is coated on the surface of the transparent substrate by a coating method such as a Roll Coater method, a Blade Coater method, an Air Knife Coater method, a Gate Roll Coater method, a Bar Coater method, a Size Press method, a Spray-Coat method, a Gravure Coater method, a Curtain Coater method, a Spin-Coat method or the like. Thereafter, the coating film is dried by using a hot air drying furnace, a heat drum, a hot plate or the like, thereby forming an ink reception layer containing ink.

According to the optical filter manufacturing method of the present invention, the ink reception layer is formed on the transparent substrate as described above, and then ink is jetted to the ink reception layer by using a liquid jetting apparatus to form an optical filter. Specifically, ink is jetted to the ink reception layer from an ink jet head provided in the liquid jetting apparatus while the ink jet head is swept relatively to the transparent substrate.

The ink used in this invention is not limited to a specific one insofar as it can be jetted from the ink jet head. Here, both water-type ink and oil-type ink can be used, however, the water-type ink is preferably used from the point of view of reliability of jetting from the ink jet head.

Various kinds of dye or pigment may be used as the color material of the ink for bring about the optical filter with the light amount adjusting function. For example, when an ND filter is manufactured, it is desired to use a color material containing a proper combination of various kinds of dyes and pigments because a substantially flat transmittance characteristic is required in the overall visible-light region.

The ink used in this embodiment has the color material and the liquid medium described above. Water or various kinds of organic solvents may be used as the liquid medium, and various kinds of water-soluble organic solvents as described below may be used as an aqueous medium.

For example, as the aqueous organic solvent, alkyl alcohols having a carbon number of 1 to 5 such as methyl alcohol, ethyl alcohol, n-propyl alcohol, isopropyl alcohol, n-butyl alcohol, sec-butyl alcohol, tert-butyl alcohol, isobutyl alcohol, n-pentanol or the like; amides such as dimethylformamide, dimetyl acetamide or the like; ketone or ketoalcohol such as acetone, diacetone alcohol or the like; ethers such as tetrahydrofuran, dioxane or the like; oxyethylene or oxypropylene copolymer such as diethylene glycol, triethylene glycol, tetraethylene glycol, dipropylene glycol, tripropylene glycol, polyethylene glycol, polypropylene glycol or the like; alkylene glycols whose alkylene group has a carbon number of 2 to 6 such as ethylene glycol, propylene glycol, trimethylene glycol, triethylene glycol, 1,2,6-hexane triol or the like; glycerin; lower alkyl ethers such as ethylene glycol monomethyl (or ethyl) ether, diethylene glycol monomethyl (or ethyl) ether, triethylene glycol monomethyl (or ethyl) ether or the like; lower dialkyl ethers of polyalcohol such as triethylene glycol dimethyl (or ethyl) ether, tetraethylene glycol dimethyl (or ethyl) ether or the like; alkanolamines such as monoethanol amine, diethanol amine, triethanol amine or the like; sulfolane, N-methyl-2-pyrrolidone, 2-pyrrolidone, or 1,3-dimethyl-2-imidazolidinone may be mentioned.

The aqueous organic solvent described above may be used independently or as a mixture. Furthermore, in addition to the above components of ink, various kinds of additives such as a surface-active agent, antifoamer, antiseptic or the like can be added if required in order to obtain an ink having a desired physical value.

In this embodiment, the ink containing the above component (liquid medium) and the color material is applied to the ink reception layer formed on the transparent substrate by using the liquid jetting apparatus to form a desired light amount adjusting area. Ink containing no color material (substantially transparent ink) is applied to a transparent area other than the light amount adjusting area in the ink reception layer.

As a method of applying the ink, a thermal type ink applying method of using an electrothermal converter as an energy generating element, an ink applying method of jetting ink by generating bubbles in the ink or a piezoelectric type ink applying method of using a piezoelectric element and jetting ink by vibrating the piezoelectric element may be used.

As described below, when the ink jet amount is required to be varied, the piezoelectric type ink applying method is preferably used because the ink jet amount can be relatively simply modulated in this method.

A liquid jetting apparatus which is commercially available may be used as an apparatus for applying ink by driving the ink jet head. However, in this case, some attention is required because the gamma correction and the color conversion processing are carried out by a printer driver. Accordingly, it is preferable to use a liquid jetting apparatus which can be adapted to the ink jetting conditions.

According to this embodiment, a light amount adjusting area having a uniform light amount adjusting function (uniform density) can be formed and a light amount adjusting area having a density gradient in which the light amount adjusting function is varied in stages or continuously can be formed by properly controlling the state of the ink jetted from the ink jet head. Particularly, according to the manufacturing method of this embodiment, the optical filter having the density gradient can be easily manufactured in the same process as the optical filter having a uniform density.

This point is significantly different from the process of manufacturing the optical filter by deposition processing or the like described in the prior art, and advantageous in manufacturing. That is, neither the deposition processing nor kneading dye or the like is needed for manufacturing the optical filter and an optical filter having excellent optical characteristics can be manufactured very easily, with high yield and at low cost.

The state of the light amount adjusting area formed by applying ink to the ink reception layer can be set to a desired state by controlling the jet amount of ink to be jetted from the ink jet head, the jet position of ink with respect to the surface of the ink reception layer, the type of ink to be used and the number of ink dots.

As described above, in this embodiment, ink containing no color material, that is, substantially transparent ink is applied to an area other than the light amount adjusting area, that is, the transparent area. In this case, the optical path lengths of the transparent area and the light amount adjusting area can be set to be equal by controlling the ink jet amount and number of ink dots.

After the ink is applied to the ink reception layer on the transparent substrate, drying process may be carried out by using the hot air drying furnace, the thermal drum, the hot plate or the like if necessary. Particularly, when a crosslinking agent is mixed in ink-absorbable material, it is effective to carry out a treatment for curing the ink reception layer, such as a treatment of heating or irradiating light. With this treatment, the optical filter can be made excellent in mechanical strength.

According to the optical filter manufacturing method of this embodiment, as described above, the ink containing the color material is applied onto the ink reception layer on the transparent substrate to form the light amount adjusting area, and then ink having no color material is applied to the transparent area. Therefore the optical path length with respect to the light amount adjusting area and the optical path length with respect to the transparent area can be set to be equal. Furthermore, a transparent flattening layer (second layer) may be provided on the ink reception layer if necessary.

The transparent flattening layer is provided to repress light scattering on the surface and inside of the ink reception layer. A material which is slightly different in refractive index from the ink-receivable material (the material of the ink reception layer) described above may be used as the material to form the transparent flattening layer. When the difference in refractive index between the ink reception layer and the transparent flattening layer is higher than predetermined value, light scattering components in the optical filter are multiplied by the effect of reflection at the boundary surface of these layers.

Out of the ink-receivable materials described above, those materials which have excellent adhesiveness to the ink reception layer, satisfy the required performance of the optical filter in mechanical strength, optical characteristics, etc., when the flattening layer is formed, and also can be laminated on the ink reception layer can be preferably used as the material for the transparent flattening layer. However, the present invention is not limited to these materials.

When above described materials are used as the coating liquid and the transparent flattening layer is formed on the surface of the ink reception layer, it can be performed by using a method such as the Roll Coater method, the Blade Coater method, the Air Knife Coater method, the Gate Roll Coater method, the Bar Coater method, the Size Press method, the Spray-Coat method, the Gravure Coater method, the Curtain Coater method, the Spin Coater method or the like. Furthermore, the film of the transparent flattening layer is formed by using above described methods, and then the film may be dried by using the hot air drying furnace, the thermal drum, the hot plate or the like.

Furthermore, as described above, in the case of the gap absorption type optical filter in which particles of alumina or the like are contained in the ink reception layer and ink is absorbed in the gaps occurring among the particles, after the ink is applied, liquid material such as silicon oil, fatty acid ester or the like may be embedded in these gaps. In this case, the transparent flattening layer described above is preferably formed (coated) on the surface of the ink reception layer in order to repress the embedded liquid material from flowing out from the ink reception layer.

According to the method for manufacturing the optical filter serving as the light amount adjusting member in this embodiment, an antireflection film (third layer) or the like may be formed on the transparent flattening layer or the transparent substrate in order to enhance the optical characteristics of the optical filter. Any material may be used as the antireflection film insofar as it can repress the surface reflection. For example, inorganic material used as the deposition film may be used or organic material such as fluorocarbon resin may be used. However, the present invention is not limited to these materials.

The method for manufacturing the optical filter according to this embodiment, the optical filter of this embodiment achieved by the method and the light amount adjusting apparatus having the optical filter will be specifically described.

The present invention is not limited to this embodiment. In the following description, parts and percents are based on a weight basis unless particularly specified.

FIG. 1 through FIG. 7 are diagrams showing this Embodiment of the present invention. In the following explanation, an ND filter for uniformly attenuating the visible light over each wavelength band is used as the light amount adjusting member, however, the present invention may be applied to an optical filter for attenuating light of a specific wavelength band in the visible band or an optical filter for attenuating ultraviolet rays or infrared rays.

Figure 1A:
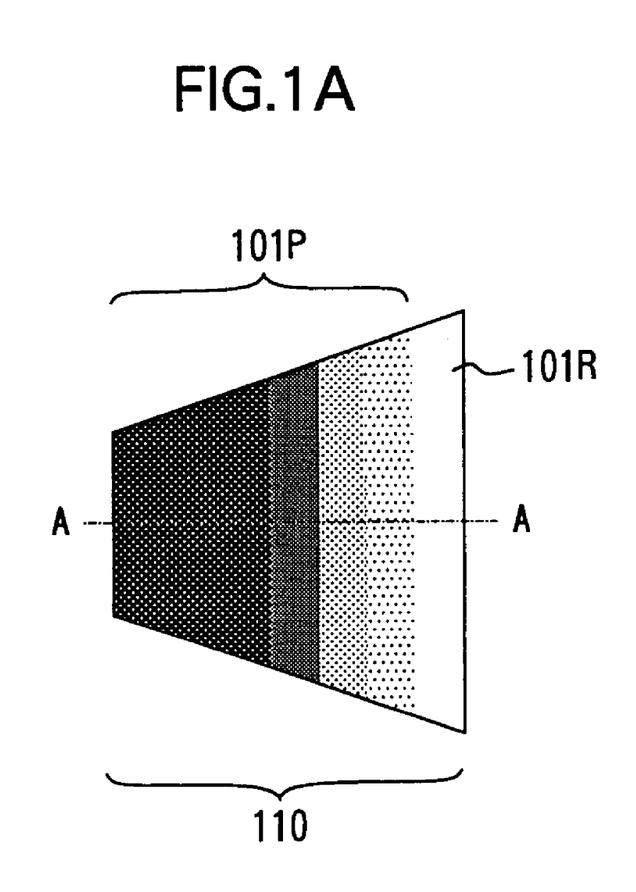
FIG. 1A is a front view of an ND filter in Embodiment 1 of the present invention.
Figure 1B:
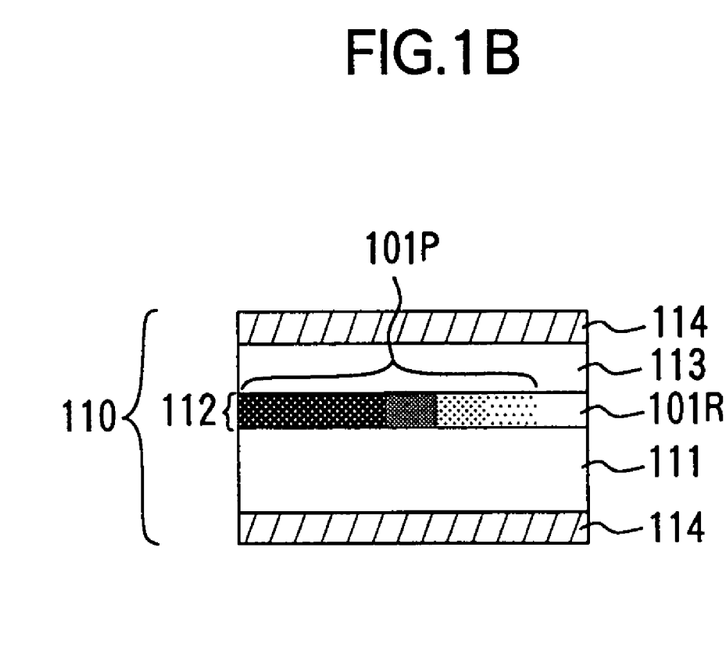
FIG. 1B is a cross-sectional view of the ND filter.

FIG. 1A is a front view of the ND filter. In FIG. 1A, Reference Numeral 110 denotes the ND filter, and it has a transparent area 101R which is a substantially transparent first area and a light amount adjusting area 101P which is a second area having a light amount adjusting function. FIG. 1B is a cross-sectional view of the ND filter on A–A' of FIG. 1A.

The method for manufacturing the ND filter according to this embodiment will be described hereunder.

Polyethylene terephthalate (PET) film 111 of 100 μm in thickness was used as the transparent substrate of the ND filter 110, and an ink reception layer (first layer) 112 was formed on the upper surface thereof by using the following method.

Polyvinyl alcohol (manufactured by Nippon Synthetic Chemical Industry Co., Ltd., Gohsenol GM-14L) was used as coating liquid, and aqueous solution containing polyvinyl alcohol resin of 10 parts assuming solid content conversion was prepared. Subsequently, the coating liquid obtained was coated on the PET film 111 as the transparent substrate by using a wire bar, and then dried at 100° C. for 5 minutes by using a hot air drying oven. The thickness of the ink reception layer 112 thus formed was equal to 7 μm.

In this embodiment, the ink to bring about the ND filter 110 with the light amount adjusting function was prepared by using the following method. That is, one kind of ink containing no color materials (ink 1) to be applied to the transparent area 101R of the ND filter 110 shown in FIG. 1, and five kinds of ink containing color material (ink 2 to 6) to be applied to the light amount adjusting area 101P having the light amount adjusting function were prepared, totaling six kinds of ink to be prepared.

As the ink to bring about the light amount adjusting function, five kinds of ink 2 to 6 which were composed of compositions shown in table 1 and contain black color materials different in color material concentration were prepared.

It is preferable that a mixture of plural kinds of dyes is used as the color material being used in order to obtain substantially flat spectral transmittance (substantially equal spectral transmittance) in the visible light area.

TABLE 1

Compositions of ink used in Embodiment 1 (unit: wt %)

|  | Ink 1 | Ink 2 | Ink 3 | Ink 4 | Ink 5 | Ink 6 |
| --- | --- | --- | --- | --- | --- | --- |
| Color material: black type dye food black 2 | 0 | 0.3 | 0.6 | 1.2 | 2.4 | 4.8 |
| Ethylene glycol | 5 | 5 | 5 | 5 | 5 | 5 |
| Diethylene glycol | 5 | 5 | 5 | 5 | 5 | 5 |
| Isopropyl alcohol | 2 | 2 | 2 | 2 | 2 | 2 |
| Acetylenol EH * | 1 | 1 | 1 | 1 | 1 | 1 |
| Ion-exchange water | 87.0 | 86.7 | 86.4 | 85.8 | 84.6 | 82.2 |

* manufactured by Kawaken Fine Chemicals Co., Ltd.

The ink (ink 2 to 5) containing the five kinds of color materials having different color material concentrations and the ink (ink 1) having no color material were applied to the PET, film 111 by using a minute droplet jetting apparatus (liquid jetting apparatus) to form an ND filter. This forming method will be described below.

Figure 3:
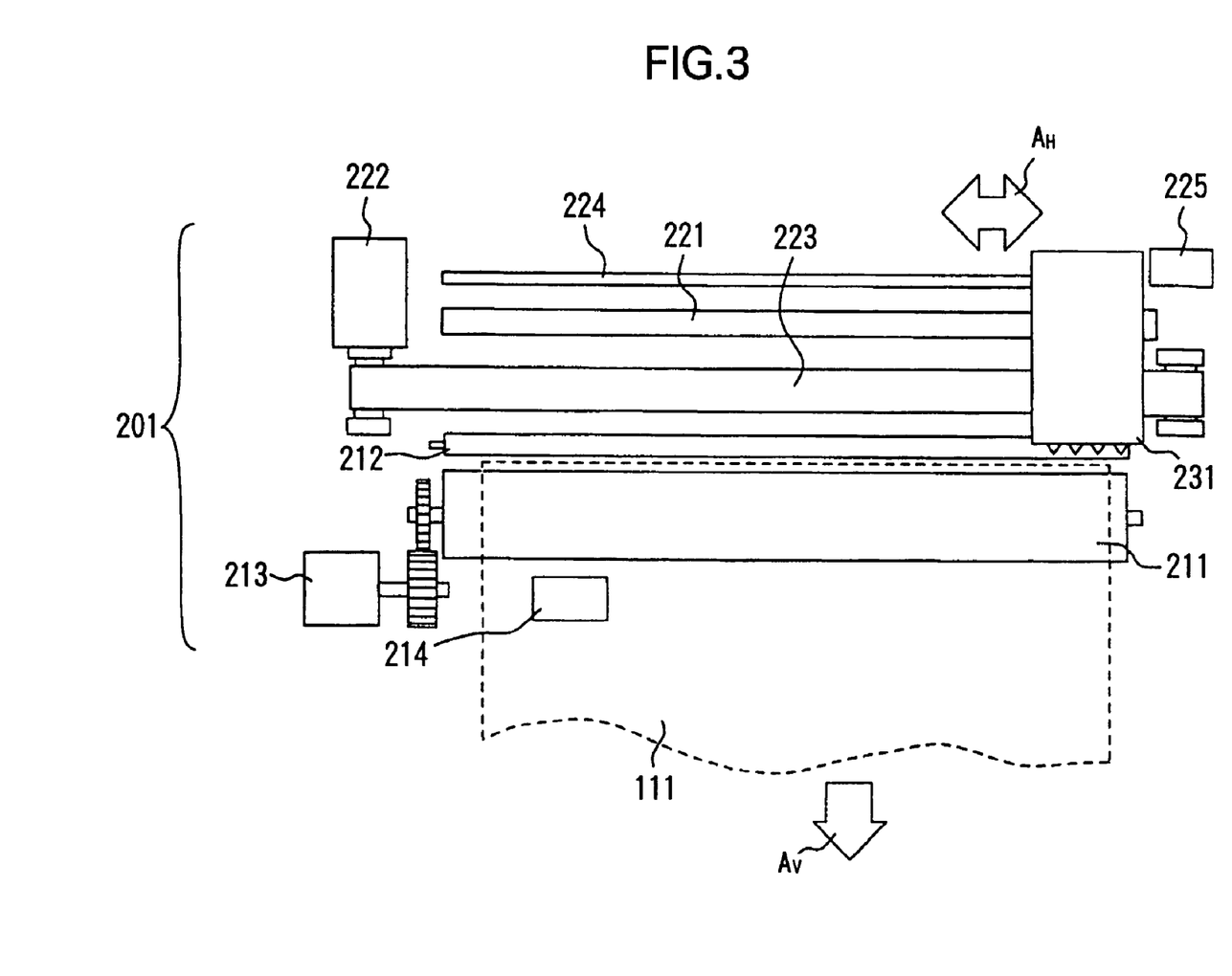
FIG. 3 is a diagram showing the structure of a main part of a minute droplet jetting apparatus used in Embodiment 1.

FIG. 3 shows the structure of the minute droplet jetting apparatus 201. In FIG. 3, the PET film 111 is held while being press-fitted with a platen 211 by a pinch roller 212. The PET film 111 is fed in a direction of an arrow Av by rotation of the pinch roller 212 interlocked with rotation of a line feed motor 213. Reference Numeral 214 denotes a sheet sensor, and it judges whether the PET film 111 is fed onto the platen 211.

Reference Numeral 231 denotes a recording head, and it is held by a guide shaft 221 so as to be movable in a direction of an arrow AH. The recording head 231 moves along the longitudinal direction of the platen 211 at a constant speed in connection with the operation of a belt 223 which is caused by rotation of a carriage motor 222. The position of the recording head 231 is detected by a linear encoder 224. Reference Numeral 225 denotes a home position sensor, and detects whether the recording head 231 is returned to an initial position at the right end in FIG. 3.

The recording head 231 has six nozzle units. Each nozzle unit is filled with materials of ink 1 to 6 shown in Table 1. Furthermore, a heater is provided in each nozzle unit. The ink in each nozzle unit is vaporized by heat of the heater to generate bubbles, and ink droplets are jetted by the pressure wave of the bubbles.

Figure 4:
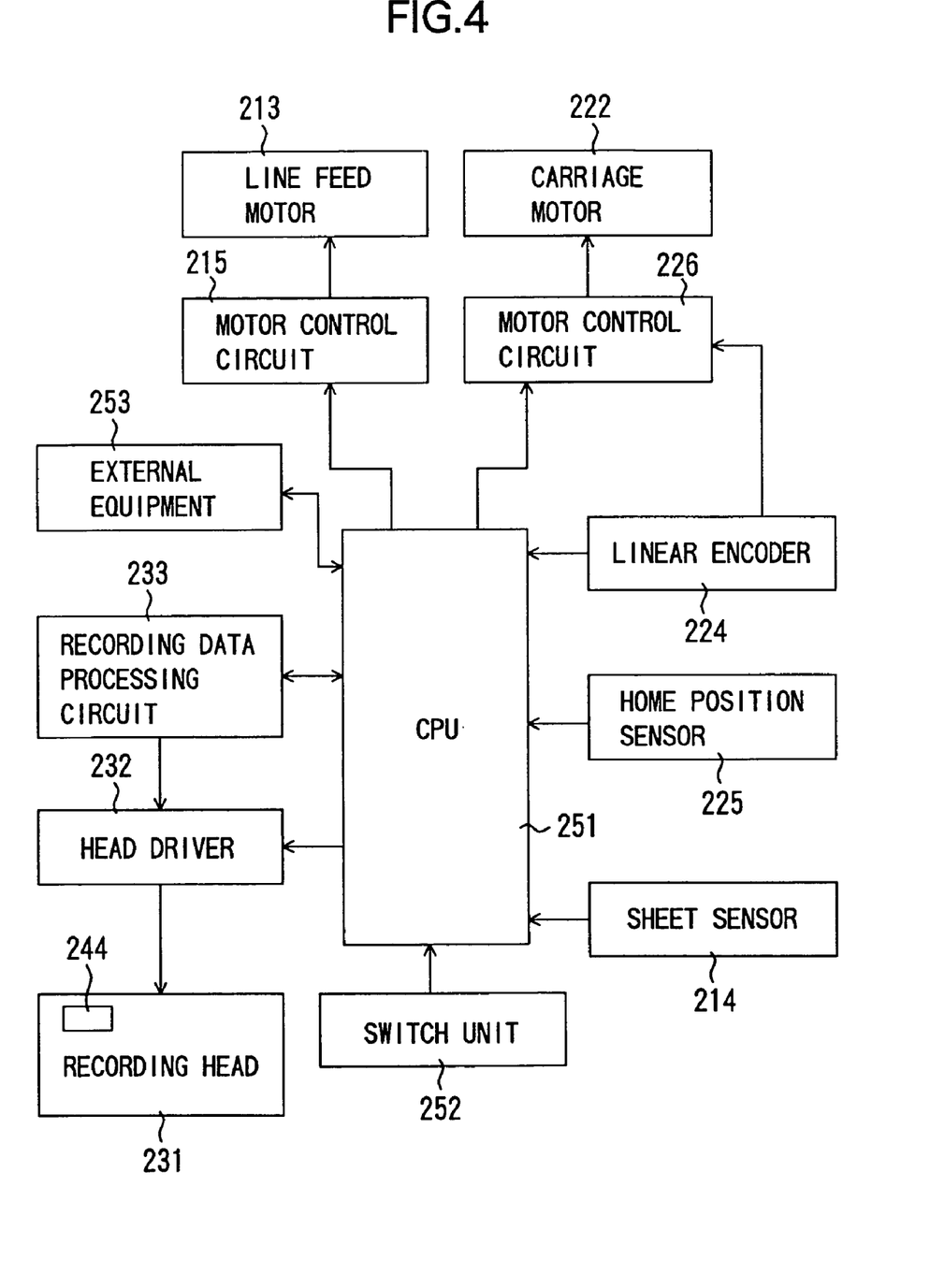
FIG. 4 is a diagram showing the control circuit of the minute droplet jetting apparatus.

FIG. 4 is a diagram showing the control circuit of the minute droplet jetting apparatus.

Reference Numeral 251 denotes a CPU which controls the overall operation of the minute droplet jetting apparatus, and Reference Numeral 252 denotes a switch unit for instructing power-on, start of printing, etc., to CPU 251. Reference Numeral 253 denotes external equipment such as a PC (Personal Computer) which decides a print density pattern of ink, etc., to the ink reception layer 112.

The motor control circuit 215 which has received a control signal from CPU 251 drives the line feed motor 213, whereby the PET film 111 is fed in the direction of the arrow Av of FIG. 3 (sub scanning) through the pinch roller 212. Here, the sheet sensor 214 detects the presence or absence of the PET film 111, and when the PET film 111 does not exist on the platen 211, the sheet supply operation of the PET film 111 is carried out. The motor control circuit 226 which has received a control signal from CPU 251 drives the carriage motor 222, so that the recording head 231 is driven in the direction of an arrow AH of FIG. 3 (main scanning).

Specifically, a continuously-rotating DC motor is used as the carriage motor 222, and CPU 251 controls the driving of the carriage motor 222 precisely on the basis of a position signal from the linear encoder 224. The home position sensor 225 detects whether the recording head 231 is returned to the initial position after one main scanning is finished.

Reference Numeral 233 denotes a recording data processing circuit which converts a density pattern generated in external equipment 253 to a jet pattern of minute droplets. The head driver 232 controls the heating of a heater 244 in the recording head 231 on the basis of a signal generated in the recording data processing circuit 233, whereby ink in the nozzle units is jetted to the ink reception layer 112.

In this embodiment, the ink 2 to 5 containing the color materials shown in Table 1 were applied onto the ink reception layer 112 on the PET film 111 to form a light amount adjusting area 101P having a predetermined density pattern. Furthermore, the ink 1 having no color material was applied to areas other than the light amount adjusting area 101P to form the transparent area 101R.

The ink reception layer 112 is formed of a polymer, and thus the ink reception layer 112 swells when it intakes ink, that is, water, so that the film thickness of the ink reception layer 112 is varied. When ink is applied to only the light amount adjusting area 101P, the section corresponding to the light amount adjusting area 101P of the ink reception layer 112 swells, however, the section corresponding to the transparent area 101R of the ink reception layer 112 does not swell. As a result, some step occurs between the light amount adjusting area 101R and the transparent area 101R, that is, the difference of the thickness in the ink reception layer 112 occurs, and thus the optical path length with respect to the light amount adjusting area 101R is different from the optical path length with respect to the transparent area 101R.

On the other hand, the sections corresponding to the areas 101P and 101R of the ink reception layers 112 are swollen by applying ink to not only the light amount adjusting area 101P, but also the transparent area 101R as shown in the embodiment. when ink is contained in the ink reception layer 112, the thickness of the ink reception layer 112 is increased by the amount corresponding to the ink content. Therefore, not only ink (colored ink) is contained in the light amount adjusting area 101P, but also ink (substantially transparent ink) is contained in the transparent area 101R serving as a substantially transparent area, whereby the thickness of the ink reception layer 112 can be set to be substantially equal between the light amount adjusting area 101P and the transparent area 101R. That is, the thickness of the ink reception layer 112 can be wholly uniformed. Accordingly, the optical path lengths with respect to the light amount adjusting area 101P and the transparent area 101R can be substantially equal Subsequently, the transparent flattening layer (second layer) 113 was formed on the ink reception layer 112 supplied with ink as described later.

An epoxy type UV-curable resin was coated on a base having an ink reception layer 112 thereon by using a Spin-Coater method. The condition of the spin coater at that time was set to 2.000 rpm and 60 seconds. After the coating, UV light was irradiated under irradiation intensity of 200 mW/cm$^2$ for 60 seconds to form the transparent flattening layer 113. The thickness of the transparent flattening layer 113 thus formed was equal to 20 $\mu$m.

Subsequently, antireflection film (third layer) 114 (FIG. 1B) was formed on both the surface of the transparent flattening layer 113 and the surface of the PET film 111 (the surface at which the ink reception layer 112 and the transparent flattening layer 113 were not formed) by using the deposition method. As disclosed in Japanese Patent Application Laid-Open No. H6(1994)-273601, a material which mainly contains silicon oxide and a material which mainly contains titanium oxide were used as the antireflection film forming material, and the above two kinds of materials were heated and vaporized by using a resistive heating method or an electron-beam heating method and alternately laminated to thereby form a five-layered antireflection film.

Thereafter, it was punched out in a press step to achieve an ND filter 110 having a desired shape.

The optical superiority when the transmittance in the light amount adjusting area 101P of the ND filter 110 is varied in stages or continuously is described in Document 1 and Document 2, for example.

As described above, according to the simple optical filter manufacturing method of this embodiment, a colored pattern is formed so that the transmittance of the light amount adjusting area 101P is varied in stages or continuously, thereby the optical filter serving as the light amount adjusting member can be manufactured. When the optical filter is applied to the light amount adjusting apparatus, the light amount adjusting apparatus of this embodiment has the light amount adjusting member which is excellent in cost and manufacturing method and can achieve the same beneficial effect as a well-known art (Patent document 2, etc.) described above.

Figure 5A:
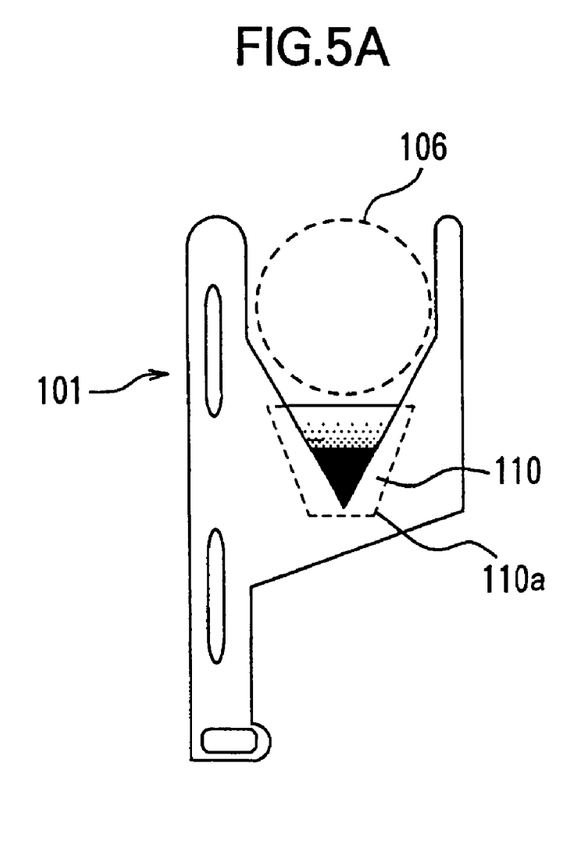
FIG. 5A and FIG. 5B are diagrams showing a diaphragm blade which has ND filter in Embodiment 1.
Figure 5B:
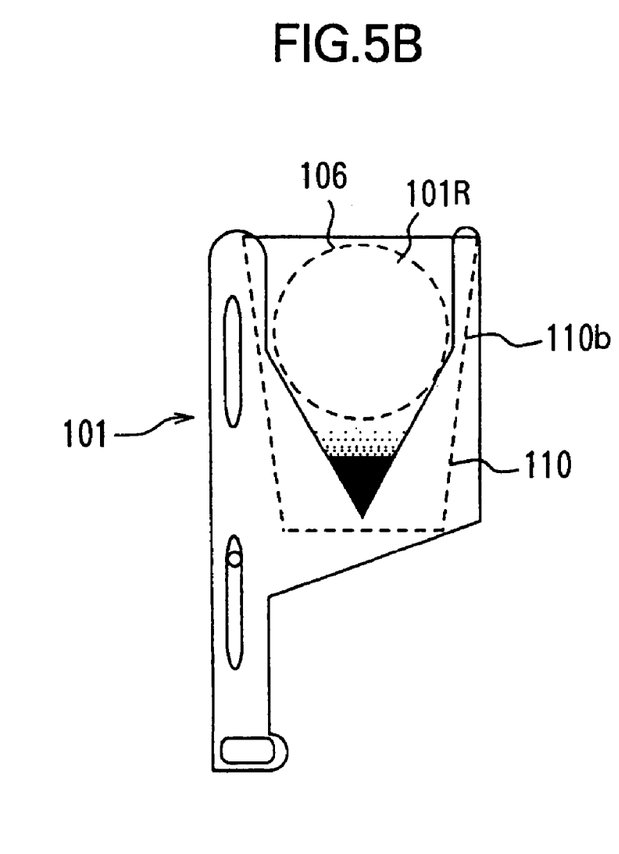

Next, a diaphragm unit which has the ND filter manufactured according to this embodiment, serving as a light amount adjusting apparatus for a video camera will be described below. FIG. 5A and FIG. 5B show a diaphragm blade which is one of the members provided in the diaphragm unit. Reference Numeral 101 denotes one diaphragm blade (light blocking member), and Reference Numeral 110 denotes the ND filter which is manufactured by the manufacturing method of this embodiment and attached to the diaphragm blade 101.

Figure 6:
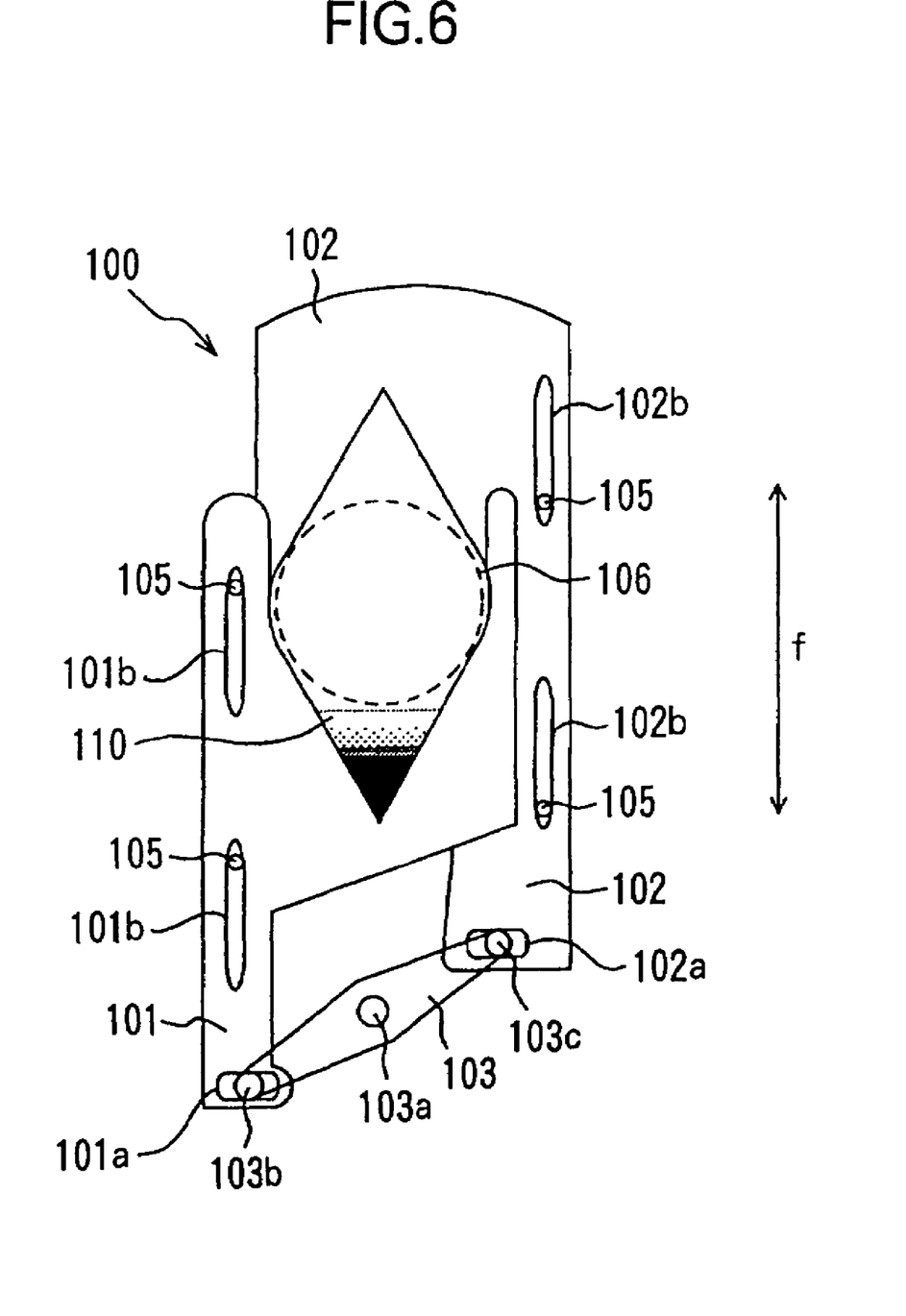
FIG. 6 is a front view of a diaphragm unit having the diaphragm blade in Embodiment 1.

FIG. 6 shows the structure of the diaphragm unit having the diaphragm blade described above. Reference Numeral 101 denotes a first diaphragm blade shown in FIG. 5A, and Reference Numeral 102 denotes a second diaphragm blade (light blocking member). Reference Numeral 103 denotes a diaphragm blade driving lever which has a hole portion 103a engaged with the shaft of a motor (not shown) and is rotatable around the hole portion 103a.

The first diaphragm blade 101 and the second diaphragm blade 102 are engaged with pins 103b and 103c provided at both ends of the diaphragm blade driving lever 103 through the hole portions 101a and 102a. Reference Numeral 105 denotes a guide pin formed on a bottom board (not shown), and the guide pin 105 engages with a groove portion 101b formed at the side edge area of the first diaphragm blade 101 and a groove portion 102b formed at the side edge area of the second diaphragm blade 102 in a slidable manner. Reference Numeral 106 denotes a circular optical path hole portion formed at the bottom board.

FIG. 6 is a front view of a diaphragm mechanism 100 when the diaphragm blades 101 and 102 are in a fully open state (release state). As the diaphragm is narrowed down from the fully open state of the diaphragm blades 101 and 102, light flux passing through the optical path hole portion 106 which is a fixed aperture is blocked by the first diaphragm blade 101 and the second diaphragm blade 102, and also dimmed by the ND filter 110 having a density gradient. Whereby the transmittance of the light flux passing through the optical path hole portion 106 can be gradually reduced, and also a sufficient dimming effect can be achieved without reducing the area of the aperture formed by the diaphragm blades 101 and 102 extremely.

The ND filter attached to the diaphragm blade may be designed to have such a shape that the optical path hole portion 106 of the bottom board (not shown) is not covered in the fully open state as indicated by dotted lines 110a of FIG. 5A or the transparent area 101R of the ND filter 110 covers the optical path hole portion 106 in the fully open state as indicated by dotted lines 110b of FIG. 5B.

The optical characteristics of the ND filter when the diaphragm unit having the ND filter of this embodiment is provided in an image taking apparatus was estimated. The estimation result is as follows.

The diaphragm unit was provided in an image taking optical system of the image taking apparatus, and image taking operation was performed by using a resolution chart as an object to measure MTF (Modulation Transfer Function). The spatial frequency on the image plane of the resolution chart thus measured was equal to 63 line pairs/mm.

MTF in the horizontal direction under a state where the ND filter 110 covered a half of the optical path hole portion 106 (diaphragm value F=2.4) was equal to 61.5 percents.

On the other hand, the measurement result of MTF of the ND filter in which the transparent ink 1 having no color material was not applied to the transparent area 101R (the areas other than the light amount adjusting area 101P of FIG. 1) was equal to 41.5 percents. The measurement condition at this time was the same as the case where the MTF measurement was carried out by using the ND filter 110 of this embodiment.

As described above, a result where the MTF value was more enhanced by using the ND filter 110 of this embodiment was achieved. That is, it was proved that the beneficial effect was achieved by applying transparent ink having no color material to the transparent area 101R.

Figure 2:
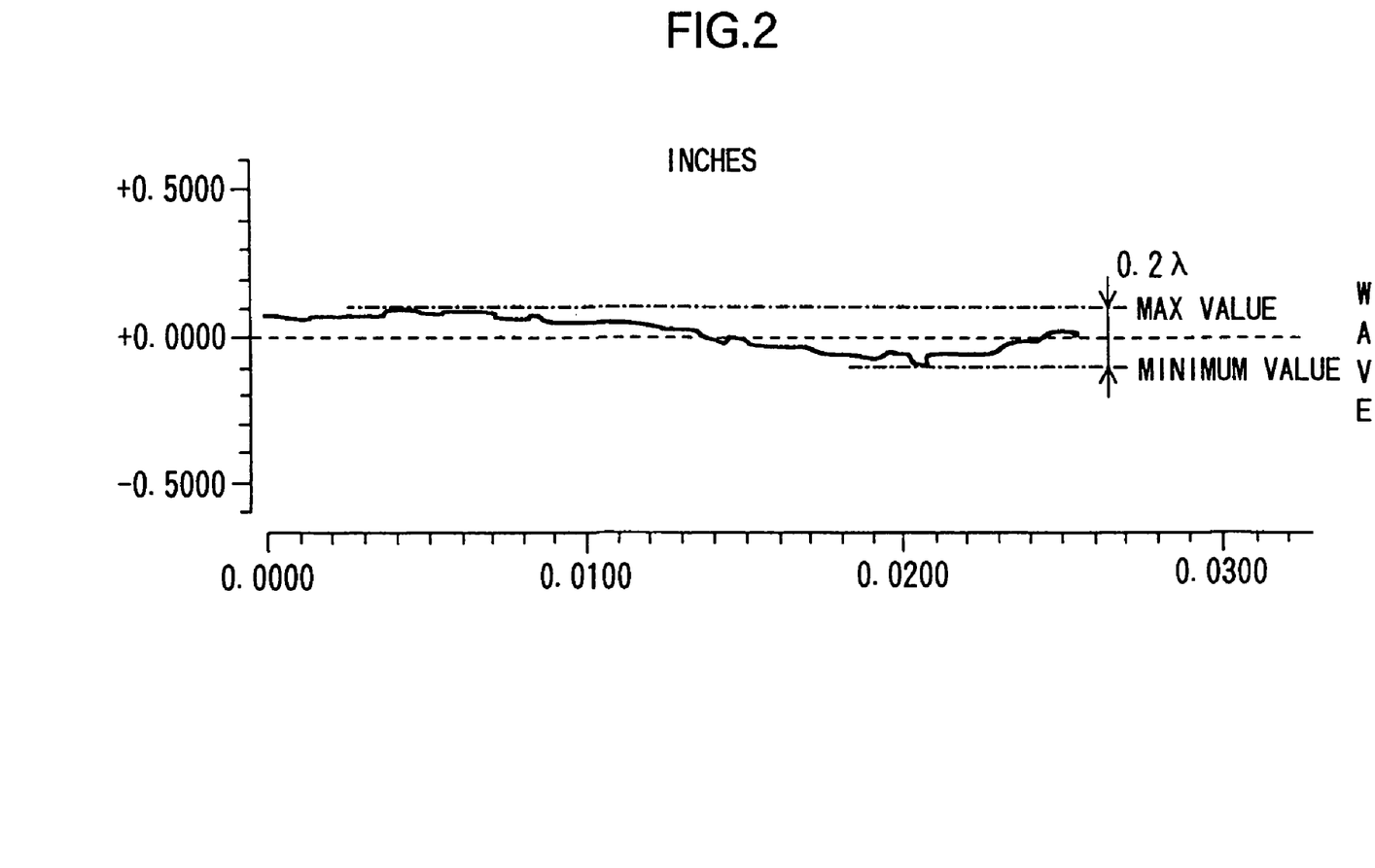
FIG. 2 is a diagram showing a measurement result of the wave aberration of the ND filter of Embodiment 1.

FIG. 2 shows a measurement result of wave aberration of the ND filter according to this embodiment which was acquired by using a laser interferometer. FIG. 2 shows the measurement result of the transmitted wave aberration on A-A' of FIG. 1.

The difference between the maximum and minimum values of the waveform shown in FIG. 2, that is, the wave aberration was equal to $0.2\lambda$. It is generally said that if the wave aberration is not more than $\lambda/4$, it would not affect an image taken, and the above result sufficiently satisfied this condition.

Figure 7:
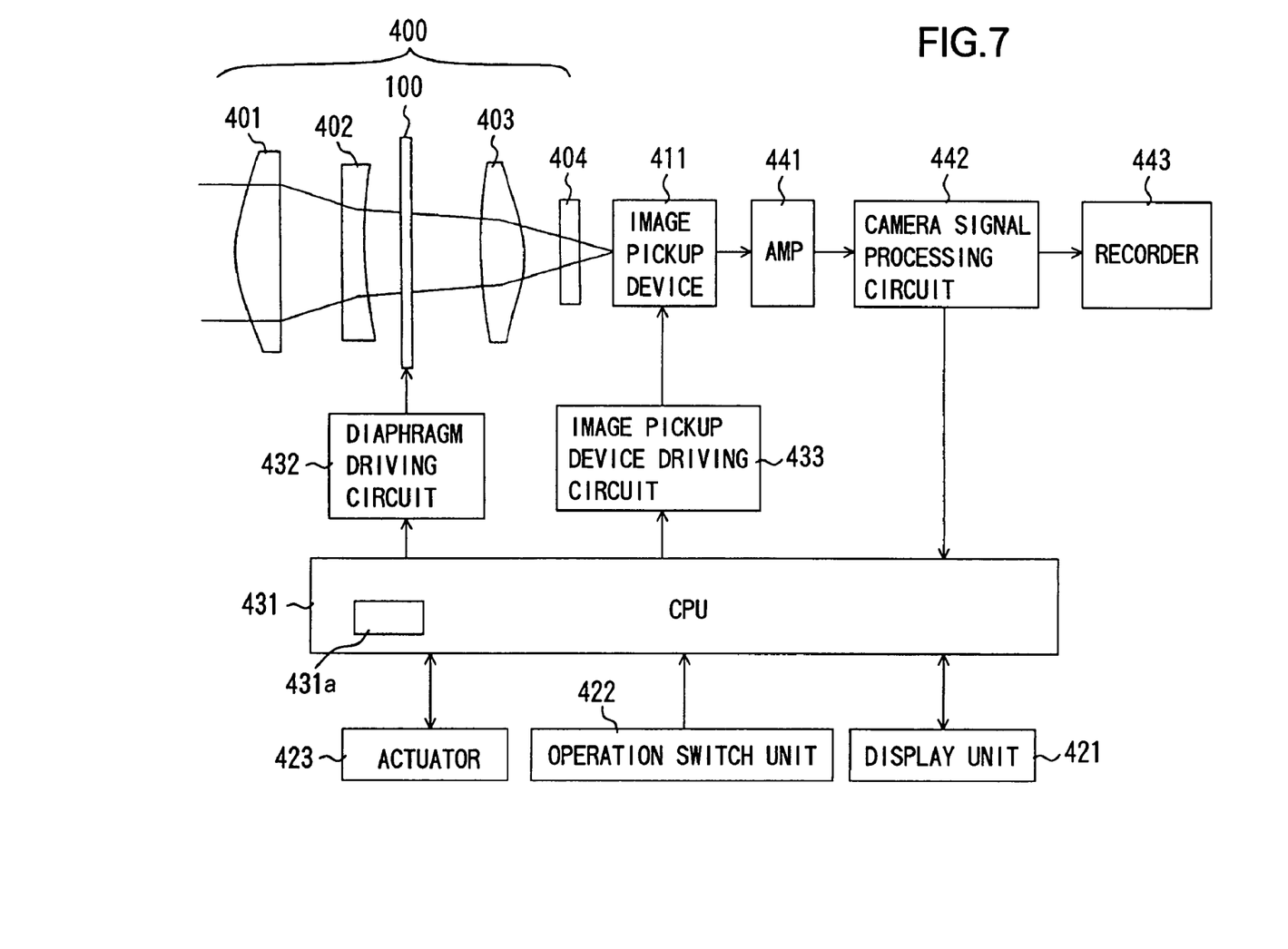
FIG. 7 is a schematic view showing the structure of an image taking apparatus which has the diaphragm unit in Embodiment 1.

FIG. 7 shows the structure of the image taking apparatus (optical apparatus) in which the diaphragm unit serving as the light amount adjusting apparatus shown in FIG. 6 is provided. In this embodiment, there will be described a case where a video camera in which an optical image formed by an image taking optical system is photoelectrically converted to an electrical signal by the image pickup device and then the electrical signal is recorded as digital data (still image data and moving image data) is used as the optical apparatus.

Reference Numeral 400 denotes an image taking optical system having a plurality of lens units, and it has a first lens unit 401, a second lens unit 402, a third lens unit 403 and the diaphragm unit 100 shown in FIG. 6. Specifically, the first lens unit 401 is a fixed front-cell lens unit, the second lens unit 402 is a variator lens unit, and the third lens unit 403 is a focusing lens unit. Reference Numeral 404 denotes an optical low pass filter.

An image pickup device 411 is disposed at the focal position (estimated imaging plane) of the image taking optical system 400. The image pickup device 411 has a plurality of photoelectrically converting sections which converts light energy received through the image taking optical system to charges, a charge accumulating section which accumulates the charges thus converted, and a charge transferring section which transfers the charges thus accumulated to the outside. Specifically, a photoelectrical conversion device such as a two-dimensional CCD or the like is used as the image pickup device 411.

Reference Numeral 421 denotes a display unit such as a liquid crystal display or the like, and displays an object image achieved by using the image pickup device 411 or the operation status of the image taking apparatus on the basis of a control signal from CPU 431. Reference Numeral 422 denotes an operation switch unit and has a zoom switch, a switch which is operated to start an image taking preparation operation, a switch which is operated to start an image taking operation and an image pickup condition switch for setting a shutter speed, etc. CPU 431 carries out predetermined operations in accordance with the outputs from these switches.

Reference Numeral 423 denotes an actuator, and it drives by receiving an output signal from CPU 431. The actuator 423 is a driving source for driving a focusing lens unit 403 to adjust the focusing state of the image taking optical system 400 and driving other members.

CPU 431 judges whether the average brightness of an object image captured by the image pickup device 411 is coincident with the value corresponding to proper exposure stored in an internal memory 431a. If there is a difference between the average brightness and the value, that is, in the case of underexposure or overexposure, the diaphragm aperture is varied or the accumulation time of charges to the image pickup device 411 is varied in accordance with the difference (absolute value).

When the diaphragm aperture is varied, CPU 431 drives a motor (not shown) through a diaphragm driving circuit 432 to rotate the diaphragm blade driving lever 103 shown in FIG. 6 around the hole portion 103a, whereby the diaphragm blades 101 and 102 move in the direction indicated by an arrow f in FIG. 6 (vertical direction in FIG. 6) Accordingly, the aperture area of the light passing opening through which image taking light flux passes is varied. Here, the aperture area of the light passing opening is gradually reduced when the diaphragm blade driving lever 103 is rotated in the clockwise direction in FIG. 6, and the aperture area is increased when the diaphragm blade driving lever 103 is rotated in the counterclockwise direction.

As described above, the optimum exposure can be achieved by varying the area of the aperture formed by the diaphragm blades 101 and 102 or the charge accumulating time.

The object image reached on the light receiving surface of the image pickup device 411 with the optimum exposure is converted to electrical signals having the charge amount corresponds to the brightness thereof at each pixel. The electrical signals are amplified by an amplifying circuit 441, and then subjected to predetermined processing such as gamma correction, etc., by a camera signal processing circuit 442. This processing may be carried out on the basis of the digital signal after A/D conversion. The video signals thus achieved are output to a recorder 443, and recorded in a recording medium (not shown)

When the diaphragm unit having the optical filter of this embodiment is disposed in the image taking apparatus (optical apparatus) which has above described construction and image data are generated, excellent image data experiencing slight diffraction influence can be achieved.

In the diaphragm unit of this embodiment, the ND filter 110 is attached to the diaphragm blades 101 and 102. However, the ND filter may move independently without being attached to the diaphragm blade. Furthermore, the light amount adjusting apparatus of this embodiment may be used for optical apparatus such as a laser beam printer, etc., as well as the image taking apparatus (a lens apparatus mounted on a camera or a camera integrated with a lens).

In this embodiment, the thickness of the ink reception layer is substantially equal between the transparent area (first area) 101R and the light amount adjusting area (second area) 101P, whereby the optical path lengths with respect to the transparent area 101R and the light amount adjusting area 101P is set to be substantially equal. Therefore, for example, when the ND filter 110 is provided in the diaphragm unit (light amount adjusting apparatus) of the image taking apparatus, the resolution of the image taken can be repressed from being reduced.

While preferred embodiments have been described, it is to be understood that modification and variation of the present invention may be made without departing from scope of the following claims.

What is claimed is:

1. An optical filter comprising:
a transparent substrate; and
an ink reception layer which is formed on the surface of the transparent substrate and is predisposed to accept ink jetted from an ink jet head, wherein
the ink reception layer has a first area which is substantially transparent and contains substantially transparent ink, and a second area which has colored ink and is light-amount adjustable, and
a difference in optical path length between the first and the second areas is at most a quarter wavelength in a visible light band.

2. The optical filter according to claim 1, wherein the transmittance in the second area is constant.

3. The optical filter according to claim 1, wherein the transmittance in the second area is varied, and the variation of the transmittance is one of the staged variation and the continual variation.

4. The optical filter according to claim 1, wherein the spectral transmittance of a visible light band in the second area is substantially constant.

5. A method of making an optical filter having a first area which is substantially transparent and a second area which is colored and light-amount adjustable, comprising:
a first step of forming an ink reception layer, which is predisposed to accept ink jetted from an ink jet head, on a surface of a transparent substrate; and
a second step of applying substantially transparent ink to the first area of the ink reception layer and applying colored ink to the second area of the ink reception layer by using an ink jet head,
wherein in the second step the transparent ink and the colored ink are applied so that a difference in optical path length between the first and the second areas is at most a quarter wavelength in a visible light band.

6. A light amount adjusting apparatus comprising:
the optical filter according to claim 1; and
a light blocking member which varies an area of a light passing opening, wherein
the optical filter is movable with respect to the light passing opening formed by the light blocking member.

7. An image taking apparatus comprising:
a lens; and
the light amount adjusting apparatus according to claim 6.

* * * * *